United States Patent
Peng

(10) Patent No.: US 10,698,563 B2
(45) Date of Patent: Jun. 30, 2020

(54) METHOD AND APPARATUS FOR COMPONENT DISPLAY PROCESSING

(71) Applicant: Huawei Device Co., Ltd., Dongguan (CN)

(72) Inventor: Yuzhuo Peng, Shenzhen (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 444 days.

(21) Appl. No.: 15/007,495

(22) Filed: Jan. 27, 2016

(65) Prior Publication Data
US 2016/0139772 A1 May 19, 2016

Related U.S. Application Data

(63) Continuation of application No. 13/572,445, filed on Aug. 10, 2012, now Pat. No. 9,256,446, which is a
(Continued)

(30) Foreign Application Priority Data

Jan. 28, 2010 (CN) .......................... 2010 1 0104157

(51) Int. Cl.
*G09G 5/00* (2006.01)
*G06F 3/048* (2013.01)
(Continued)

(52) U.S. Cl.
CPC .......... *G06F 3/04817* (2013.01); *G06F 3/017* (2013.01); *G06F 3/0481* (2013.01);
(Continued)

(58) Field of Classification Search
CPC ............ G09G 2340/0407; G09G 5/391; G06T 3/4023; G06T 3/40; G06F 3/0481
See application file for complete search history.

(56) References Cited

U.S. PATENT DOCUMENTS 5,835,090 A 11/1998 Clark et al.
6,344,864 B1 2/2002 Watanabe
(Continued)

FOREIGN PATENT DOCUMENTS

CA 2298437 A1 9/2000
CN 101167122 A 4/2008
(Continued)

OTHER PUBLICATIONS

Takeo Igarashi et al:"Speed-dependent automatic zooming for browsing large documents", Proceedings of the 2000 ACM SIGCPR conference, XP001171601, Nov. 5, 2000, total 10 pages.
(Continued)

*Primary Examiner* — Ke Xiao
*Assistant Examiner* — Andrew Shin

(57) ABSTRACT

Embodiments of the present invention provide a component display processing method and apparatus. The method includes: receiving indication information indicating that a component is in a waiting-to-be-processed state; and according to the indication information, reducing a displayed region of a container that is displayed on a display screen, so that t a hidden region of the container is displayed on the display screen.

18 Claims, 4 Drawing Sheets

Related U.S. Application Data continuation of application No. PCT/CN2011/070733, filed on Jan. 28, 2011.

(51) Int. Cl.
| | | |
|---|---|---|
| *G06K 9/36* | (2006.01) | |
| *G06K 9/32* | (2006.01) | |
| *G06F 3/0481* | (2013.01) | |
| *G06F 3/0485* | (2013.01) | |
| *G06F 3/0486* | (2013.01) | |
| *G06T 11/60* | (2006.01) | |
| *G06F 9/451* | (2018.01) | |
| *G06F 3/01* | (2006.01) | |
| *G06F 3/0482* | (2013.01) | |

(52) U.S. Cl.
CPC .......... *G06F 3/0482* (2013.01); *G06F 3/0485* (2013.01); *G06F 3/0486* (2013.01); *G06F 9/451* (2018.02); *G06T 11/60* (2013.01); *G06F 2203/04806* (2013.01); *G09G 2340/0407* (2013.01)

(56) References Cited

U.S. PATENT DOCUMENTS

| | | |
|---|---|---|
| 7,010,755 B2 | 3/2006 | Anderson et al. |
| 7,350,154 B2 | 3/2008 | Anderson et al. |
| 7,458,032 B2 | 11/2008 | Terada |
| 7,469,381 B2 | 12/2008 | Ording |
| 9,182,911 B2 | 11/2015 | Park et al. |
| 9,372,620 B2 | 6/2016 | Tolmasky et al. |
| 2002/0113823 A1 | 8/2002 | Card et al. |
| 2003/0076362 A1 | 4/2003 | Terada |
| 2004/0141008 A1 | 7/2004 | Jarczyk et al. |
| 2004/0174398 A1 | 9/2004 | Luke et al. |
| 2005/0188329 A1 | 8/2005 | Cutler et al. |
| 2006/0026521 A1 | 2/2006 | Hotelling et al. |
| 2006/0097991 A1 | 5/2006 | Hotelling et al. |
| 2006/0170824 A1 | 8/2006 | Johnson et al. |
| 2006/0176403 A1 | 8/2006 | Gritton et al. |
| 2006/0190833 A1 | 8/2006 | Sangiovanni et al. |
| 2006/0248404 A1 | 11/2006 | Lindsay et al. |
| 2007/0061745 A1 | 3/2007 | Anthony et al. |
| 2008/0036743 A1 | 2/2008 | Westerman et al. |
| 2008/0146286 A1 | 6/2008 | Byun et al. |
| 2008/0189658 A1 | 8/2008 | Jeong et al. |
| 2008/0252662 A1 | 10/2008 | Hyatt |
| 2009/0064055 A1 | 3/2009 | Chaudhri et al. |
| 2009/0073132 A1 | 3/2009 | Lee et al. |
| 2009/0109184 A1 | 4/2009 | Kim et al. |
| 2009/0178008 A1 | 7/2009 | Herz et al. |
| 2009/0228820 A1 | 9/2009 | Kim et al. |
| 2009/0244019 A1 | 10/2009 | Choi |
| 2009/0249247 A1 | 10/2009 | Tseng et al. |
| 2009/0281720 A1 | 11/2009 | Jakobson |
| 2009/0293007 A1 | 11/2009 | Duarte et al. |
| 2010/0022276 A1 | 1/2010 | Park et al. |
| 2010/0095240 A1* | 4/2010 | Shiplacoff ............ G06F 3/0483 715/784 |
| 2010/0223563 A1 | 9/2010 | Green |
| 2010/0281481 A1 | 11/2010 | Rainisto et al. |
| 2010/0295789 A1 | 11/2010 | Shin et al. |
| 2010/0313165 A1 | 12/2010 | Louch et al. |
| 2010/0325573 A1 | 12/2010 | Estrada et al. |
| 2012/0139951 A1 | 6/2012 | Hwang et al. |
| 2013/0009999 A1 | 1/2013 | Peng |

FOREIGN PATENT DOCUMENTS

| | | |
|---|---|---|
| CN | 101199203 A | 6/2008 |
| CN | 101241413 A | 8/2008 |
| CN | 101263479 A | 9/2008 |
| CN | 101356492 A | 1/2009 |
| CN | 101419524 A | 4/2009 |
| CN | 201266965 Y | 7/2009 |
| CN | 101620509 A | 1/2010 |
| CN | 101635767 A | 1/2010 |
| CN | 101641673 A | 2/2010 |
| CN | 101674301 A | 3/2010 |
| CN | 101763270 A | 6/2010 |
| CN | 101802763 A | 8/2010 |
| CN | 102439558 A | 5/2012 |
| CN | 102460361 A | 5/2012 |
| CN | 102460372 A | 5/2012 |
| CN | 102486716 A | 6/2012 |
| CN | 103034390 A | 4/2013 |
| EP | 1217508 A1 | 6/2002 |
| JP | H09106334 A | 4/1997 |
| JP | H09305344 A | 11/1997 |
| JP | H1145164 A | 2/1999 |
| JP | 2002341990 A | 11/2002 |
| JP | 2003108281 A | 4/2003 |
| JP | 2005100199 A | 4/2005 |
| JP | 2006300955 A | 11/2006 |
| JP | 2008527540 A | 7/2008 |
| JP | 2009042993 A | 2/2009 |
| JP | 2010039538 A | 2/2010 |
| JP | 2013254528 A | 12/2013 |
| KR | 20060056678 A | 5/2006 |
| KR | 20070093084 A | 9/2007 |
| KR | 101567594 B1 | 11/2015 |
| RU | 2335011 C2 | 9/2008 |
| WO | 2006074267 A2 | 7/2006 |
| WO | 2009032750 A1 | 3/2009 |
| WO | 2009046743 A1 | 4/2009 |
| WO | 2009086631 A1 | 7/2009 |
| WO | 2009141971 A1 | 11/2009 |
| WO | 2011091762 A1 | 8/2011 |

OTHER PUBLICATIONS

Takeshi Nishida et al: "Drag-and-Guess:Drag-and-Drop with Prediction", UIST 2006 adjunct proceedings demonstrations, XP055153808, 2006, total 2 pages.

Steve Jones et al: "An evaluation of integrated zooming and scrolling on small screens", international journal of hunan-computer studies, XP004995927, 2005, total 34 pages.

"Move Windows Between Spaces via Drag", http://hints.macworld.com/article.php?story=20071025140916203, Oct. 2007, total 2 pages.

"IPhone User Guide for iPhone OS3.1 Software",Sep. 2009,total 46 pages.

"Webpage information of Samsung P3 product", Link: http://v.youku.com/v_show/id_XNzAzMDEwMTY=.html?beta&from=s1.8-1-1.2&spm=0.0.0.0.bMJbVS,2009,total 3 pages.

"Phone User manual", Link: http://support.apple.com/zh_CN/manuals/iPhone,2009,total 12 pages.

"Web page information of Lenovo 01 mobile phone product",Link: http://v.youku.com/v_show/id_XMTAyNjk5NDM2.html?beta$from=s1.8-1-1.2&spm=0.0.0.0.jAAXaa, and link: http://mobile.pconline.com.cn/review/0905/1663271_all. html#content_page_3,2009,total 26 pages.

"Web page information of 'Samsung P3 touch Operation interface demo' ",2016,total 3 pages.

"Web page information of 'Lenovo 01 official function demo video for the first time exposure' ",2016,total 4 pages.

* cited by examiner

METHOD AND APPARATUS FOR COMPONENT DISPLAY PROCESSING

CROSS-REFERENCE TO RELATED APPLICATIONS

This application is a continuation of U.S. patent application Ser. No. 13/572,445, filed on Aug. 10, 2012. The U.S. patent application Ser. No. 13/572,445 is a continuation of International Application No. PCT/CN2011/070733, filed on Jan. 28, 2011, which claims priority to Chinese Patent Application No. 201010104157.0, filed on Jan. 28, 2010. The afore-mentioned patent applications are hereby incorporated by reference in their entireties.

FIELD OF THE INVENTION

The present invention relates to the field of communications, and in particular, to a component display processing method and apparatus.

BACKGROUND OF THE INVENTION

With the continuous development of electronic technologies, various user equipments (User Equipments, UEs for short), for example, a mobile phone, a personal computer (Personal Computer, PC for short), and a play station portable (Play Station Portable, PSP for short), have been widely used. Many components may be placed on a user interface (User Interface) of each type of UE, for example, shortcuts of various application programs, Widget, a file, or a folder in the PC, which is convenient for a user to use these components to perform corresponding operations, for example, opening a file or initiating a corresponding application program.

In the prior art, these components are accommodated in a container of a UE. The so-called container is a region for accommodating the components, a region displayed on a display screen of the UE is a part of the container, and a part of the components of the container is displayed in the display screen region. Therefore, a size of the container is generally adapted to a size of the display screen of the UE or is larger than the size of the display screen of the UE. Accordingly, the container may be divided into a displayed region and a hidden region. On the display screen of the UE, only a part of the various components in the container can be displayed, and other components are placed in the hidden region of the container. In order to edit a component that needs to be displayed in the displayed region, the user may move a component in the displayed region into the hidden region, and may also move a component in the hidden region into the displayed region. There are mainly two existing manners for moving the component. According to one manner, on a touch screen, the user may move the component by adopting a touching manner, so that the component is moved on the displayed region, or is moved between the displayed region and the hidden region. According the other manner, on a non-touch screen, the user may move the component on the displayed region or move the component between the displayed region and the hidden region through manners such as clicking a mouse.

SUMMARY OF THE INVENTION

Accordingly, embodiments of the present invention provide a component display processing method apparatus.

An embodiment of the present invention provides a component display processing method, including: receiving indication information indicating that a component is in a waiting-to-be-processed state; and according to the indication information, reducing a displayed region of a container that is displayed on a display screen so that a hidden region of the container is displayed on the display screen.

Another embodiment of the present invention provides a user equipment, including: a display screen; one or more processors coupled to a storage medium and configured to: receive indication information indicating that a component is in a waiting-to-be-processed state; and according to the indication information, reduce a displayed region of a container that is displayed on the display screen so that a hidden region of the container is displayed on the display screen.

A further embodiment of the present invention provides a non-transitory computer-readable storage medium with an executable program stored thereon, wherein the program instructs one or more processors to perform the following steps: receive indication information indicating that a component is in a waiting-to-be-processed state; and according to the indication information, reduce a displayed region of a container that is displayed on a display screen so that a hidden region of the container is displayed on the display screen.

BRIEF DESCRIPTION OF THE DRAWINGS

To illustrate the technical solutions according to the embodiments of the present invention or in the prior art more clearly, the accompanying drawings required for describing the embodiments or the prior art are briefly introduced below. Apparently, the accompanying drawings in the following descriptions merely show some of the embodiments of the present invention, and persons of ordinary skill in the art can obtain other accompanying drawings according to these accompanying drawings without creative efforts.

DETAILED DESCRIPTION OF THE EMBODIMENTS

Figure 1:
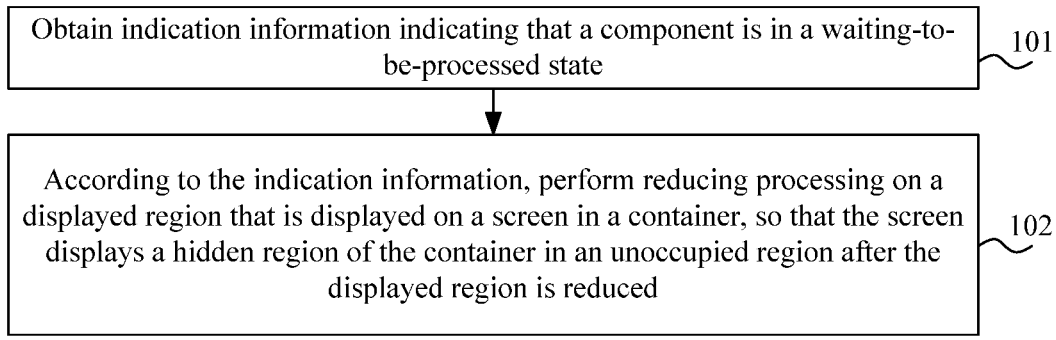
FIG. 1 is a flow chart of Embodiment 1 of a component display processing method according to the present invention.

In order to make the objectives, technical solutions, and advantages of the present invention more comprehensible, the technical solutions according to embodiments of the present invention are clearly and completely described in the following with reference to the accompanying drawings. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

In an existing intelligent UE, component moving is an extremely common operation. When components are in a mode that allows the components to be moved, for example, an editing mode, a user can move the components through manners, such as dragging, a mouse, a cursor or a focus shift, so that the components may be moved to any position in a container of the UE. However, currently, under a normal circumstance, the user does not know the feature that the container is larger than a displaying region of a UE, and moreover, due to an influence of an operating habit, the user does not know that a hidden region outside the displaying region of the display screen of a UE may also be used to place the components. Further, even the user knows the feature that the container is larger than the displaying region, when the user moves a component to a periphery of the displaying region of the display screen of the UE, the current displayed region can be switched to the adjacent hidden region only after several seconds staying, while the user generally considers that an object of moving the component into the hidden region in the container may be achieved by directly moving the component to the periphery of the display screen, which results in a failure in the component movement operation.

In order to solve the problem, an embodiment of the present invention provides a component display processing method, where the method may include: obtaining indication information indicating that a component is in a waiting-to-be-processed state; and according to the indication information, performing reducing processing on a displayed region that is displayed on a display screen in a container, so that the display screen displays a hidden region of the container in an unoccupied region after the displayed region is reduced, where the container includes the displayed region and the hidden region for accommodating components.

In the embodiments of the present invention, when the user needs to perform processing on a component, the displayed region on the display screen may be dynamically reduced, so that the hidden region of the container is displayed on the display screen. In this way, the user is prompted that processing may be performed on components in the displayed region and the hidden region. Therefore, in the embodiments of the present invention, no matter whether the user knows the feature that the container is larger than the displaying region of the UE, the user may be prompted that a placement location of the component may not only be the displayed region that is displayed on the screen in the container, but also may be the hidden region besides the displayed region in the container, thereby facilitating operations by the user on all components in the container, and improving operation experience of the user.

In the following, the technical solutions of the embodiments of the present invention are described in detail with reference to several specific embodiments.

Embodiment 1

FIG. 1 is a flow chart of Embodiment 1 of a component display processing method according to the present invention. As shown in FIG. 1, the method of this embodiment may include:

Step 101: Obtain indication information indicating that a component is in a waiting-to-be-processed state.

For example, in this embodiment, the indication information may be indication information indicating that one or some components are in a selected state, or after a user clicks a button of a UE, the UE obtains this operation by the user and triggers indication information. Persons skilled in the art may enable the UE to obtain the indication information indicating that one or some components are in the waiting-to-be-processed state by adopting any manner, and details are not repeated herein.

When it is required to move one component or several components that are placed in a displayed region displayed on a display screen in a container, the user may trigger a state of the component or the several components to be a processable mode, so that the component or the several components are in the waiting-to-be-processed state. In this embodiment, the user may trigger the component to be in the processable mode by adopting any manner in the prior art. For example, if the UE is a PC, the user may click the component through a mouse to trigger the component to be in the processable mode; and if the UE is a mobile terminal, the user may select the component by adopting a focus shifting mode, so as to trigger the component to be in the processable mode. Definitely, this embodiment of the present invention includes, but is not limited to, the foregoing manners for triggering the component to be in the processable mode.

When the user completes the operation, the UE may obtain indication information indicating that one or several components are in the waiting-to-be-processed state.

Step 102: According to the indication information, perform reducing processing on the displayed region that is displayed on the display screen in the container, so that the display screen displays a hidden region of the container in an unoccupied region after the displayed region is reduced.

After obtaining the indication information, the UE knows that the user needs to process the component or the several components, so the UE may perform reducing processing on the displayed region that is displayed on the display screen in the container. The displayed region that is originally displayed on the display screen merely occupies a part of the region of the entire display screen after the reducing processing, while the unoccupied region of the display screen after the reducing may be used to display the hidden region of the container. The hidden region is displayed on the screen, so that the user is prompted that the component may be moved into the hidden region that is displayed.

It should be noted that, in this embodiment, the UE may be any existing device with a screen for display, for example, a PC, a mobile terminal, a PSP, and an MP4, and the component may be any existing movable system object, for example, Widget, a shortcut, a file, or a folder. Definitely, in this embodiment of the present invention, the UE includes, but is not limited to, the foregoing devices, and the component includes, but is not limited to, the foregoing system objects.

In this embodiment, when the user needs to move a component, the displayed region on the display screen may be dynamically reduced, so that the hidden region of the container is displayed on the display screen. In this way, the user is prompted that the component may be moved into the hidden region that is displayed on the display screen. Therefore, in this embodiment, no matter whether the user knows the feature that the container is larger than a displaying region of the UE, the user may be prompted that a placement location of the component may not only be the displayed region that is displayed on the display screen in the container, but also may be the hidden region besides the displayed region in the container, thereby facilitating the operation of moving the component by the user, improving a success rate of the component movement operation, and improving operation experience of the user.

Embodiment 2

Figure 2:
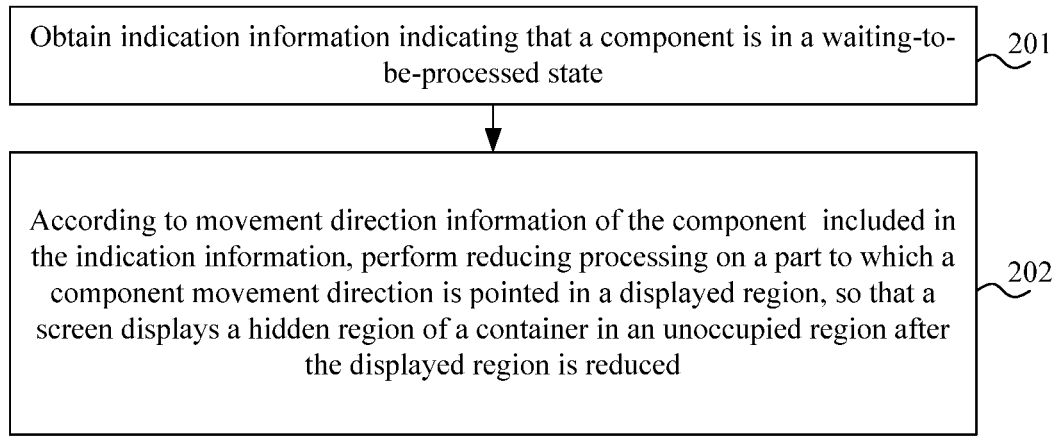
FIG. 2 is a flow chart of Embodiment 2 of a component display processing method according to the present invention.

FIG. 2 is a flow chart of Embodiment 2 of a component display processing method according to the present invention. As shown in FIG. 2, the method of this embodiment may include:

Step 201: Obtain indication information indicating that a component is in a waiting-to-be-processed state.

The indication information includes movement direction information of the component. The execution process of step 201 is similar to that of step 101 shown in FIG. 1, and details are not repeated herein.

Step 202: According to the movement direction information of the component included in the indication information, perform reducing processing on a part of a displayed region to which the movement direction of the component is pointed, so that a display screen displays a hidden region of a container in an unoccupied region after the displayed region is reduced.

In this embodiment, the indication information obtained by a UE may include the movement direction information of the component, and the movement direction information of the component may be a trend direction in which a user moves the component.

For example, if the movement direction of the component included in the indication information that is obtained by the UE is a right side of the screen, the UE may perform the reducing processing on the right side of the displayed region that is displayed on the display screen in the container, so that the hidden region of the container is displayed in the unoccupied region at the right side of the displayed region of the display screen, and in this way, the user is prompted that the component may be moved into the hidden region that is displayed at the right side of the display screen in the container. If the movement direction of the component included in the indication information that is obtained by the UE is an upper side of the screen, the UE may perform the reducing processing on the upper side of the displayed region that is displayed on the display screen in the container, so that the hidden region of the container is displayed in the unoccupied region at the upper side of the displayed region of the display screen, and in this way, the user is prompted that the component may be moved into the hidden region that is displayed at the upper side of the display screen in the container.

It should be noted that, in this embodiment, when the UE performs the reducing processing on the part of the displayed region to which the movement direction of the component is pointed, the entire part at the side of the display screen corresponding to the movement direction may be reduced, or the reducing processing may be performed only on a part at the side of the display screen, so that the hidden region of the container can be displayed. Definitely, this embodiment includes, but is not limited to the foregoing manners.

In this embodiment, when the user needs to move a component, the displayed region on the display screen may be dynamically reduced according to the direction in which the user moves the component, so that the hidden region of the container is displayed in the unoccupied region after the displayed region is reduced. In this way, the user is prompted that the component may be moved into the hidden region that is displayed on the screen. Therefore, in this embodiment, no matter whether the user knows the feature that the container is larger than a displaying region of the UE, the user may be prompted that a placement location of the component may not only be the displayed region that is displayed on the display screen in the container, but also may be the hidden region besides the displayed region in the container, thereby facilitating the operation of moving the component by the user, improving a success rate of the component movement operation, and improving operation experience of the user.

Embodiment 3

Figure 3:
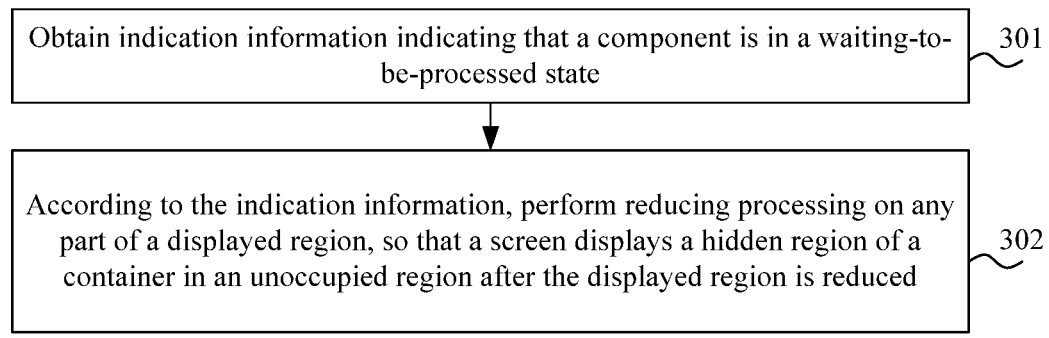
FIG. 3 is a flow chart of Embodiment 3 of a component display processing method according to the present invention.

FIG. 3 is a flow chart of Embodiment 3 of a component display processing method according to the present invention. As shown in FIG. 3, the method of this embodiment may include:

Step 301: Obtain indication information indicating that a component is in a waiting-to-be-processed state.

The execution process of step 301 is similar to that of step 101 shown in FIG. 1, and details are not repeated herein.

Step 302: According to the indication information, perform reducing processing on any part of a displayed region, so that a display screen displays a hidden region of a container in an unoccupied region after the displayed region is reduced.

In this embodiment, after obtaining the indication information, a UE may perform the reducing processing on any part of the displayed region. The UE may, according to a preset policy or randomly, determine a part of the displayed region on which the reducing processing is performed and an area of the part that needs to be reduced. Therefore, the display screen can display the hidden region of the container in the unoccupied region after the displayed region is reduced, so that the user is prompted that the component may be moved into the hidden region that is displayed on the display screen in the container.

In this embodiment, when the user needs to move a component, the displayed region on the display screen may be dynamically reduced randomly or according to a preset policy, so that the hidden region of the container is displayed in the unoccupied region after the displayed region is reduced. In this way, the user is prompted that the component may be moved into the hidden region that is displayed on the display screen in the container. Therefore, in this embodiment, no matter whether the user knows the feature that the container is larger than a displaying region of the UE, the user may be prompted that a placement location of the component may not only be the displayed region that is displayed on the display screen in the container, but also may be the hidden region besides the displayed region in the container, thereby facilitating the operation of moving the component by the user, improving a success rate of the component movement operation, and improving operation experience of the user.

Embodiment 4

Figure 4:
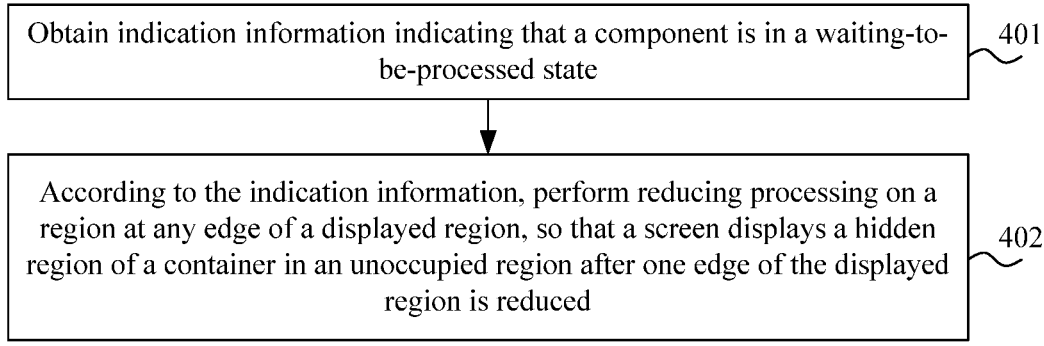
FIG. 4 is a flow chart of Embodiment 4 of a component display processing method according to the present invention.

FIG. 4 is a flow chart of Embodiment 4 of a component display processing method according to the present invention. As shown in FIG. 4, the method of this embodiment may include:

Step 401: Obtain indication information indicating that a component is in a waiting-to-be-processed state.

The execution process of step 401 is similar to that of step 101 shown in FIG. 1, and details are not repeated herein.

Step 402: According to the indication information, perform reducing processing on a region at any one of edges of a displayed region, so that a display screen displays a hidden region of a container in an unoccupied region after the edge of the displayed region is reduced.

A difference between this embodiment and the method embodiment shown in FIG. 3 lies in that, after obtaining the indication information, a UE may perform the reducing processing on a region at any one of edges of the displayed region of the container, for example, perform the reducing processing on a left edge, a right edge, an upper edge, or a lower edge of the displayed region of the container, so that the user is prompted that the component may be moved into the hidden region of the container that is displayed on the screen.

In this embodiment, when the user needs to move a component, the UE may perform dynamic reducing processing on any one of edges of the displayed region on the display screen, so that the hidden region of the container is displayed in the unoccupied region after the displayed region is reduced. In this way, the user is prompted that the component may be moved into the hidden region that is displayed on the display screen in the container. Therefore, in this embodiment, no matter whether the user knows the feature that the container is larger than a displaying region of the UE, the user may be prompted that a placement location of the component may not only be the displayed region that is displayed on the display screen in the container, but also may be the hidden region besides the displayed region in the container, thereby facilitating the operation of moving the component by the user, improving a success rate of the component movement operation, and improving operation experience of the user.

Embodiment 5

Figure 5:
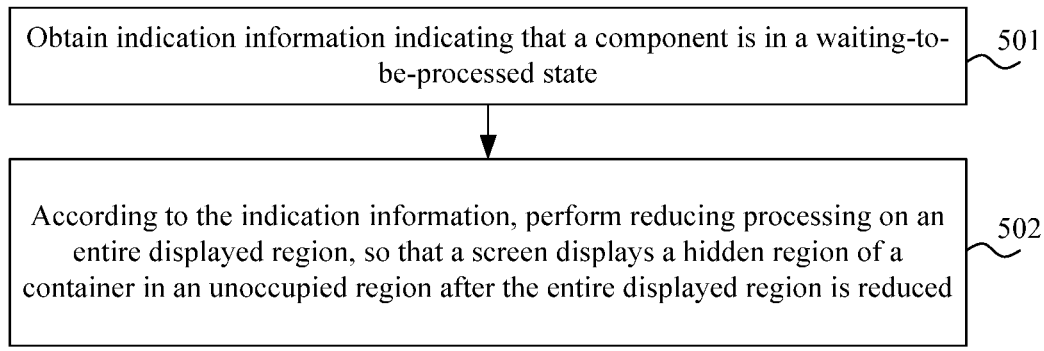
FIG. 5 is a flow chart of Embodiment 5 of a component display processing method according to the present invention.

FIG. 5 is a flow chart of Embodiment 5 of a component display processing method according to the present invention. As shown in FIG. 5, the method of this embodiment may include:

Step 501: Obtain indication information indicating that a component is in a waiting-to-be-processed state.

The execution process of step 501 is similar to that of step 101 shown in FIG. 1, and details are not repeated herein.

Step 502: According to the indication information, perform reducing processing on an entire displayed region, so that a display screen displays a hidden region of a container in an unoccupied region after the entire displayed region is reduced.

A difference between this embodiment and the method embodiment shown in FIG. 3 or FIG. 4 lies in that, in this embodiment, when the reducing processing is performed on the displayed region that is displayed on the display screen in the container, the entire displayed region is reduced, so that all peripheral regions of the displayed region are unoccupied, and the hidden region of the container is displayed in the peripheral regions of the displayed region. In this way, a user is prompted that the component may be moved into the hidden region that is displayed at the periphery of the display screen in the container.

In this embodiment, when the user needs to move a component, the UE may perform dynamical reducing processing on the entire displayed region on the display screen, so that the hidden region of the container is displayed in the peripheral regions that are unoccupied after the displayed region is reduced. In this way, the user is prompted that the component may be moved into the hidden region that is displayed on the display screen in the container. Therefore, in this embodiment, no matter whether the user knows the feature that the container is larger than a displaying region of the UE, the user may be prompted that a placement location of the component may not only be the displayed region that is displayed on the screen in the container, but also may be a hidden region beyond the displayed region in the container, thereby facilitating the operation of moving the component by the user, improving a success rate of the component movement operation, and improving operation experience of the user.

Embodiment 6

Figure 6:
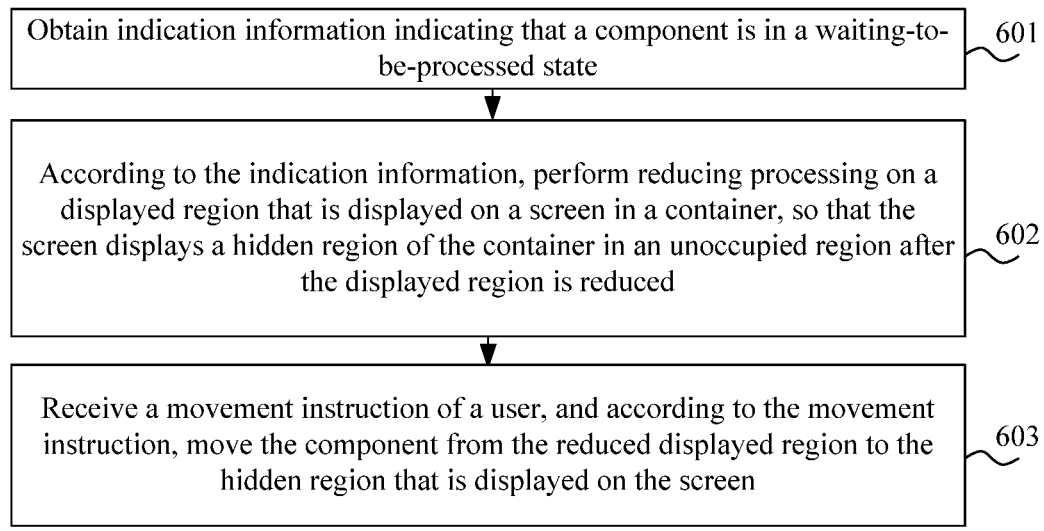
FIG. 6 is a flow chart of Embodiment 6 of a component display processing method according to the present invention.

FIG. 6 is a flow chart of Embodiment 6 of a component display processing method according to the present invention. As shown in FIG. 6, the method of this embodiment may include:

Step 601: Obtain indication information indicating that a component is in a waiting-to-be-processed state.

The execution process of step 601 is similar to that of step 101 shown in FIG. 1, and details are not repeated herein.

Step 602: According to the indication information, perform reducing processing on a displayed region that is displayed on a display screen in a container, so that the screen displays a hidden region of the container in an unoccupied region after the displayed region is reduced.

The execution process of step 602 is similar to that of step 102 shown in FIG. 1, and details are not repeated herein.

It should be noted that, an implementation manner of step 602 may be any one of the implementation manners shown in FIG. 2 to FIG. 5, and details are not repeated herein.

Step 603: Receive a movement instruction from a user, and move, according to the movement instruction, the component from the reduced displayed region into the hidden region that is displayed on the display screen.

In a specific implementation process, the step 603 may be implemented by adopting two manners.

One implementation manner may be: After the component is moved from the reduced displayed region to a junction between the reduced displayed region and the hidden region that is displayed on the display screen, content displayed on the display screen is switched in a shifting manner to completely display the hidden region, so that the component is moved into the hidden region.

In this implementation manner, the container may be in plane form, that is, the displayed region that is displayed on the display screen in the container and the hidden region that is not displayed on the display screen are on the same plane. Therefore, when the component is moved to the junction between the reduced displayed region and the hidden region that is displayed on the display screen, the content displayed on the display screen may be switched in the shifting manner to completely display the hidden region on the entire display screen, so that the component is moved into the hidden region of the container.

The other implementation manner may be: After the component is moved from the reduced displayed region to the junction between the reduced displayed region and the hidden region that is displayed on the display screen, the content displayed on the display screen is switched in a reversing manner to completely display the hidden region, so that the component is moved into the hidden region.

In this implementation manner, the container may be in a three-dimensional shape, that is, the displayed region that is displayed on the display screen in the container and the hidden region that is not displayed on the display screen are respectively located at different surfaces of the container. When the component is moved to the junction between the reduced displayed region and the hidden region that is displayed on the display screen, the content displayed on the display screen may be switched in the reversing manner to completely display the hidden region on the entire display screen, so that the component is moved into the hidden region of the container.

Taking a container in a cube shape as an example, the displayed region that is displayed on the display screen in the container may be a surface of the cube, while other five surfaces of the cube are the hidden region that is not displayed on the display screen. When it is required to move the component, the entire displayed region that is displayed on the display screen in the container may be reduced, so that a part of the hidden region on four surfaces that are adjacent to the surface of the displayed region in the container is displayed on the display screen. When the component is moved to the junction between the reduced displayed region and the hidden region that is display on the display screen, for example, to a junction at a right side, the content displayed on the display screen may be reversed. The process is similar to pushing the container in the cube shape, so that the five surfaces where the hidden region is located are respectively displayed on the display screen, and the component is moved into the hidden region of the container.

It should be noted that, the container in this implementation manner is not limited to be in a cube shape, and persons of ordinary skill in the art may set the shape of the container to be any three-dimensional shape as required.

In this embodiment, when the user needs to move a component, the UE may perform dynamical reducing processing on the displayed region on the display screen, so that the hidden region of the container is displayed in the unoccupied region after the displayed region is reduced. In this way, the user is prompted that the component may be moved into the hidden region that is displayed on the display screen in the container. Moreover, in the component movement process, an effect of component movement may be implemented by adopting different manners. Therefore, in this embodiment, no matter whether the user knows the feature that the container is larger than a displaying region of the UE, the user may be prompted that a placement location of the component may not only be the displayed region that is displayed on the screen in the container, but also may be the hidden region besides the displayed region in the container, thereby facilitating the operation of moving the component by the user, improving a success rate of the component movement operation, and improving operation experience of the user.

Embodiment 7

Figure 7:
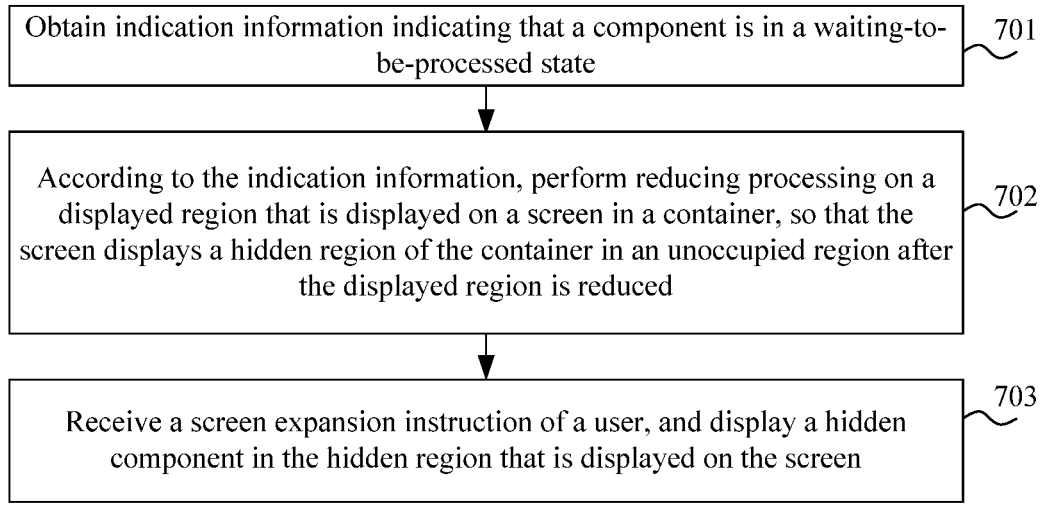
FIG. 7 is a flow chart of Embodiment 7 of a component display processing method according to the present invention.

FIG. 7 is a flow chart of Embodiment 7 of a component display processing method according to the present invention. As shown in FIG. 7, the method of this embodiment may include:

Step 701: Obtain indication information indicating that a component is in a waiting-to-be-processed state.

The indication information obtained in step 701 indicates that the component is in the waiting-to-be-processed state, that is, the component is in a waiting-to-be-processed mode. The execution process of step 701 is similar to that of step 101 shown in FIG. 1, and details are not repeated herein.

Step 702: According to the indication information, perform reducing processing on a displayed region that is displayed on a display screen in a container, so that the display screen displays a hidden region of the container in an unoccupied region after the displayed region is reduced.

The execution process of step 702 is similar to that of step 102 shown in FIG. 1, and details are not repeated herein.

It should be noted that, an implementation manner of step 702 may be any one of the implementation manners in FIG. 2 to FIG. 5, and details are not repeated herein.

Step 703: Receive a screen expansion instruction from a user, and according to the screen expansion instruction, display a new displayed region on the display screen, where the new displayed region is the reduced original displayed region and the hidden region that is displayed on the display screen.

Specifically, after the displayed region on the display screen is reduced, through exposing the hidden region, the user may be prompted that an available component is stored in the hidden region. Therefore, the user may send the screen expansion instruction to a UE. The screen expansion instruction may be configured to instruct the UE to display a hidden component in the hidden region that is displayed on the display screen. Therefore, the UE may display, on the display screen, a component that is originally displayed in the displayed region and the component that is originally stored in the hidden region, so that, through screen expansion, more components are displayed on the display screen for use by the user. For example, before the displayed region on the display screen is reduced, the UE may display nine components on the display screen; and after the displayed region on the display screen is reduced, the UE may display three more components in the hidden region that is exposed, so that twelve components may be displayed on the current display screen. It should be noted that, persons skilled in the art may display more components in the hidden region that is exposed after the displayed region is reduced as required by adopting different component display sizes and component display manners, which is convenient for the user to perform operations on these components, thereby achieving better user experience.

Embodiment 8

Figure 8:
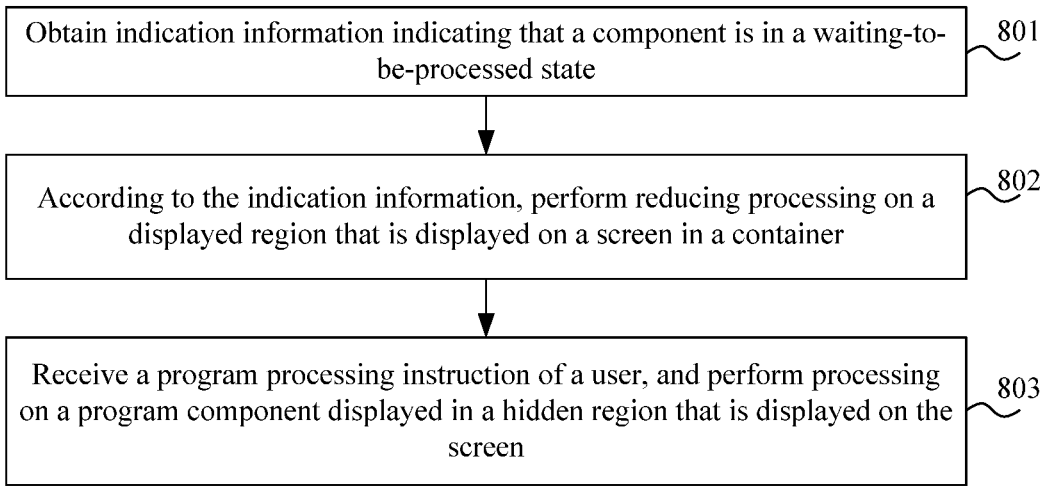
FIG. 8 is a flow chart of Embodiment 8 of a component display processing method according to the present invention.

FIG. 8 is a flow chart of Embodiment 8 of a component display processing method according to the present invention. As shown in FIG. 8, the method of this embodiment may include:

Step 801: Obtain indication information indicating that a component is in a waiting-to-be-processed state.

The indication information obtained in step 801 indicates that the component is in the waiting-to-be-processed state, that is, the component is in an editable mode. The execution process of step 801 is similar to that of step 101 shown in FIG. 1, and details are not repeated herein.

Step 802: According to the indication information, perform reducing processing on a displayed region that is displayed on a display screen in a container, so that the screen displays a hidden region of the container in an unoccupied region after the displayed region is reduced.

The execution process of step 802 is similar to that of step 102 shown in FIG. 1, and details are not repeated herein.

It should be noted that, an implementation manner of step 802 may be any one of the implementation manners in FIG. 2 to FIG. 5, and details are not repeated herein.

Step 803: Receive a program processing instruction from a user, and perform processing on a program component displayed in the hidden region that is displayed on the display screen.

Specifically, after the displayed region on the display screen is reduced, through exposing the hidden region, the user may be prompted that an available component is stored in the hidden region. Therefore, the user may send a program processing instruction to a UE to perform processing on a hidden component displayed in the hidden region that is displayed on the display screen. The processing may include operations such as opening the program component, and deleting the program component, and so on; and moreover, a type of the program component may be any type in the prior art, for example, a notepad program component and so on. Therefore, the user may perform processing on a component that is originally displayed in the displayed region, and may also perform processing on the component that is originally stored in the hidden region, which is convenient for the user to process the component that is stored in the hidden region, and improves operation experience of the user.

Persons skilled in the art should understand that all or a part of the steps of the foregoing method embodiments may be implemented by programs instructing relevant hardware. The programs may be stored in a computer readable storage medium. When the programs are run, the steps of the method embodiments are executed. The storage medium may be any medium that is capable of storing a program code, such as a ROM, a RAM, a magnetic disk, and a Compact Disc-Read Only Memory, and so on.

Figure 9:
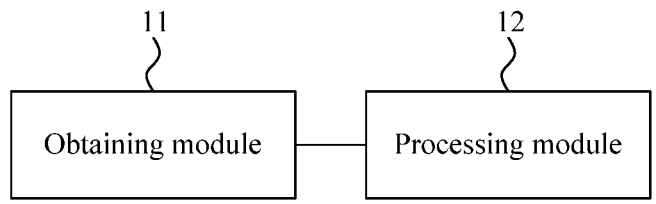
FIG. 9 is a schematic structural diagram of Embodiment 1 of a user equipment according to the present invention.

FIG. 9 is a schematic structural diagram of Embodiment 1 of a user equipment according to the present invention. As shown in FIG. 9, the UE of this embodiment may include an obtaining module 11 and a processing module 12. The obtaining module 11 is configured to obtain indication information indicating that a component is in a waiting-to-be-processed state. The processing module 12 is configured to perform, according to the indication information, reducing processing on a displayed region that is display on a display screen in a container, so that the display screen displays a hidden region of the container in an unoccupied region after the displayed region is reduced, where the container includes the displayed region and the hidden region for accommodating components.

The UE of this embodiment may be any existing device with a display screen for display, for example, a PC, a mobile terminal, a PSP, and an MP4. In the UE of this embodiment, when a user needs to perform processing on the component, the displayed region displayed on the display screen may be dynamically reduced, so that the hidden region of the container is displayed on the display screen. In this way, the user is prompted that components in the displayed region and the hidden region may be processed. Therefore, in this embodiment, no matter whether the user knows the feature that the container is larger than a displaying region of the UE, the user may be prompted that a placement location of the component may not only be the displayed region that is displayed on the display screen in the container, but also may be the hidden region besides the displayed region in the container, thereby facilitating operations by the user on all components in the container, and improving operation experience of the user.

When the indication information is indication information indicating that the component is in a waiting-to-be-processed state, an implementation principle is similar to the implementation principle of the method embodiment shown in FIG. 1, and details are not repeated herein. Therefore, the UE of this embodiment may be convenient for the user in the operation of moving the component, thereby improving a success rate of the component movement operation, and improving operation experience of the user.

Embodiment 2 of a user equipment according to the present invention may adopt the schematic structural diagram shown in FIG. 9. In this embodiment, the processing module 12 is configured to perform, according to movement direction information of a component included in indication information, reducing processing on a part of a displayed region to which a movement direction of the component is pointed, so that a display screen displays a hidden region of a container in an unoccupied region after the displayed region is reduced.

An implementation principle of the UE of this embodiment is similar to the implementation principle of the method embodiment shown in FIG. 2, and details are not repeated herein.

When a user needs to move a component, the UE of this embodiment may perform dynamic reducing on the displayed region on the display screen according to a direction in which the user moves the component, so that the hidden region of the container is displayed in the unoccupied region after the displayed region is reduced. In this way, the user is prompted that the component may be moved into the hidden region that is displayed on the display screen. Therefore, in this embodiment, no matter whether the user knows the feature that the container is larger than the displaying region of the UE, the user may be prompted that a placement location of the component may not only be the displayed region that is displayed on the display screen in the container, but also may be the hidden region besides the displayed region in the container, thereby facilitating the operation of moving the component by the user, improving a success rate of the component movement operation, and improving operation experience of the user.

Embodiment 3 of a user equipment according to the present invention may adopt the schematic structural diagram shown in FIG. 9. In this embodiment, the processing module 12 is configured to perform, according to indication information, reducing any part of a displayed region, so that a display screen displays a hidden region of a container in an unoccupied region after the displayed region is reduced.

An implementation principle of the UE of this embodiment is similar to the implementation principle of the method embodiment shown in FIG. 3, and details are not repeated herein.

When a user needs to move a component, the UE of this embodiment may perform dynamic reducing on the displayed region on the display screen randomly or according to a preset policy, so that the hidden region of the container is displayed in the unoccupied region after the displayed region is reduced. In this way, the user is prompted that the component may be moved into the hidden region that is displayed on the display screen in the container. Therefore, in this embodiment, no matter whether the user knows the feature that the container is larger than the displaying region of the UE, the user may be prompted that a placement location of the component may not only be the displayed region that is displayed on the screen in the container, but also may be the hidden region beyond the displayed region in the container, thereby facilitating the operation of moving the component by the user, improving a success rate of the component movement operation, and improving operation experience of the user.

Embodiment 4 of a user equipment according to the present invention may adopt the schematic structural diagram shown in FIG. 9. In this embodiment, the processing module 12 is configured to perform, according to indication information, reducing processing on a region at any one of edges of a displayed region, so that a display screen displays a hidden region of a container in an unoccupied region after one of edges of the displayed region is reduced.

An implementation principle of the UE of this embodiment is similar to the implementation principle of the method embodiment shown in FIG. 4, and details are not repeated herein.

When a user needs to move a component, the UE of this embodiment may perform dynamical reducing processing on any one of edges of the displayed region on the screen, so that the hidden region of the container is displayed in the unoccupied region after the displayed region is reduced. In this way, the user is prompted that the component may be moved into the hidden region that is displayed on the display screen in the container. Therefore, in this embodiment, no matter whether the user knows the feature that the container is larger than the displaying region of the UE, the user may be prompted that a placement location of the component may not only be the displayed region that is displayed on the display screen in the container, but also may be the hidden region besides the displayed region in the container, thereby facilitating the operation of moving the component by the user, improving a success rate of the component movement operation, and improving operation experience of the user.

Embodiment 5 of a user equipment according to the present invention may adopt the schematic structural diagram shown in FIG. 7. In this embodiment, the processing module 12 is configured to perform, according to the indication information, reducing processing on an entire displayed region, so that a display screen displays a hidden region of a container in an unoccupied region after the entire displayed region is reduced.

An implementation principle of the UE of this embodiment is similar to the implementation principle of the method embodiment shown in FIG. 5, and details are not repeated herein.

When a user needs to move a component, the UE of this embodiment may perform reducing processing on the entire displayed region on the display screen, so that the hidden region of the container is displayed in peripheral regions that are unoccupied after the displayed region is reduced. In this way, the user is prompted that the component may be moved into the hidden region that is displayed on the display screen in the container. Therefore, in this embodiment, no matter whether the user knows the feature that the container is larger than the displaying region of the UE, the user may be prompted that a placement location of the component may not only be the displayed region that is displayed on the display screen in the container, but also may be the hidden region besides the displayed region in the container, thereby facilitating the operation of moving the component by the user, improving a success rate of the component movement operation, and improving operation experience of the user.

Figure 10:
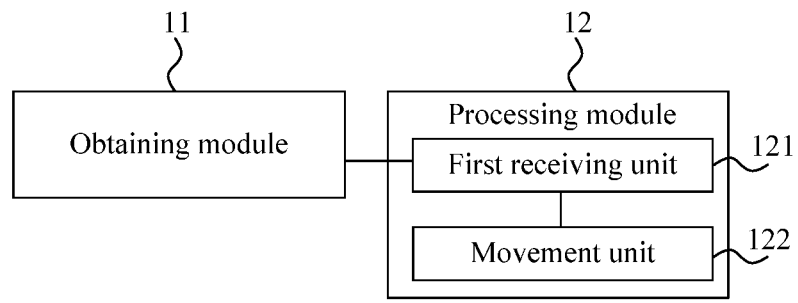
FIG. 10 is a schematic structural diagram of Embodiment 6 of a user equipment according to the present invention.

FIG. 10 is a schematic structural diagram of Embodiment 6 of a user equipment according to the present invention. As shown in FIG. 10, based on the UE shown in FIG. 9, in the UE of this embodiment, further, the processing module 12 may include a first receiving unit 121 and a movement unit 122. The first receiving unit 121 is configured to receive a movement instruction from a user. The movement unit 122 is configured to move, according to the movement instruction, a component from a reduced displayed region into a hidden region that is displayed on a display screen.

In a specific implementation process, the movement unit 122 may implement the movement of the component by adopting two implementation manners. According to one manner, the movement unit 122 is configured to switch, in a shifting manner, content displayed on the display screen to completely display the hidden region after the component is moved from the reduced displayed region to a junction between the reduced display area and the hidden region that is displayed on the display screen, so that the component is moved into the hidden region. According to the other manner, the movement unit 122 is configured to switch, in a reversing manner, the content displayed on the display screen to completely display the hidden region after the component is moved from the reduced displayed region to the junction between the reduced displayed region and the hidden region that is displayed on the display screen, so that the component is moved into the hidden region.

An implementation principle of the UE of this embodiment is similar to the implementation principle of the method embodiment shown in FIG. 6, and details are not repeated herein.

When the user needs to move a component, the UE of this embodiment may perform dynamical reducing processing on the displayed region on the display screen, so that the hidden region of the container is displayed in the unoccupied region after the displayed region is reduced. In this way, the user is prompted that the component may be moved into the hidden region that is displayed on the display screen in the container. Moreover, in the component movement process, an effect of component movement may be implemented by adopting different manners. Therefore, in this embodiment, no matter whether the user knows the feature that the container is larger than a displaying region of the UE, the user may be prompted that a placement location of the component may not only be the displayed region that is displayed on the display screen in the container, but also may be the hidden region besides the displayed region in the container, thereby facilitating the operation of moving the component by the user, improving a success rate of the component movement operation, and improving operation experience of the user.

Figure 11:
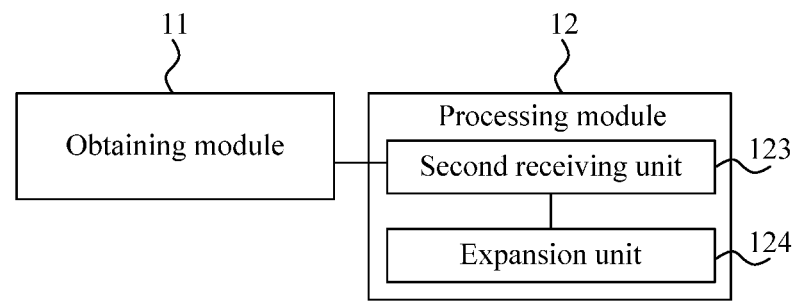
FIG. 11 is a schematic structural diagram of Embodiment 7 of a user equipment according to the present invention.

FIG. 11 is a schematic structural diagram of Embodiment 7 of a user equipment according to the present invention. As shown in FIG. 11, based on the UE shown in FIG. 9, in the UE of this embodiment, further, the processing module 12 may include a second receiving unit 123 and an expansion unit 124. The second receiving unit 123 is configured to receive a screen expansion instruction from a user. The expansion unit 124 is configured to display, according to the screen expansion instruction, a new displayed region on a display screen, where the new displayed region is a reduced original displayed region and a hidden region that is displayed on the display screen.

An implementation principle of the UE of this embodiment is similar to the implementation principle of the method embodiment shown in FIG. 7, and details are not repeated herein.

The UE of this embodiment may display, on the display screen, a component that is originally displayed in the displayed region and a component that is originally stored in the hidden region, so that, through screen expansion, more components are displayed on the display screen for use by the user, which is convenient for the user to perform operations on these components, thereby achieving better user experience.

Figure 12:
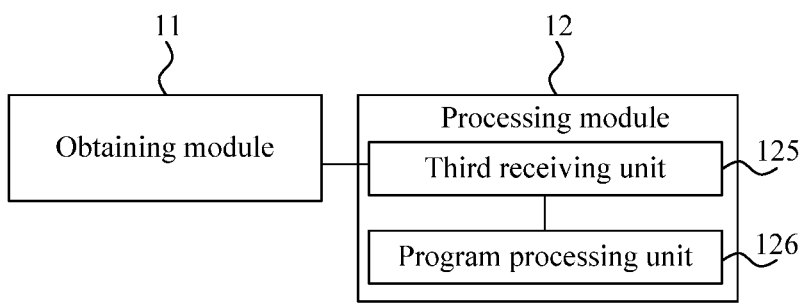
FIG. 12 is a schematic structural diagram of Embodiment 8 of a user equipment according to the present invention.

FIG. 12 is a schematic structural diagram of Embodiment 8 of a user equipment according to the present invention. As shown in FIG. 12, based on the UE shown in FIG. 9, in the UE of this embodiment, further, the processing module 12 may include a third receiving unit 125 and a program processing unit 126. The third receiving unit 125 is configured to receive a program processing instruction from a user. The program processing unit 126 is configured to perform processing on a program component displayed in a hidden region that is displayed on a display screen.

An implementation principle of the UE of this embodiment is similar to the implementation principle of the method embodiment shown in FIG. 8, and details are not repeated herein.

In the UE of this embodiment, the user may perform processing on a component that is originally displayed in a displayed region, and may also perform processing on a component that is originally stored in the hidden region, which is convenient for the user to process the component that is stored in the hidden region, and improves operation experience of the user.

Finally, it should be noted that the foregoing embodiments are merely provided for describing the technical solutions of the present invention, but not intended to limit the present invention. It should be understood by persons skilled in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A method for displaying a widget on a display of a mobile phone, comprising:
displaying a first user interface region, wherein one or more widgets is capable of being placed in the first user interface region, a first widget being located in the first user interface region;
detecting a first user operation on the first widget in a touching manner;
in response to detecting the first user operation on the first widget,
enabling the first widget to be allowed to be moved,
reducing the first user interface region, and
displaying the reduced first user interface region so that a second user interface region is indicated on the display while the first user interface region is reduced,
wherein one or more widgets is capable of being placed in the second user interface region;
detecting a dragging operation on the first widget;
in response to detecting the dragging operation on the first widget,
moving the first widget being located in the reduced first user interface region from the reduced first user interface region to the second user interface region, and
displaying the second user interface region on the display without displaying the first user interface region, wherein the first widget is displayed on the second user interface region;
wherein after the first widget being located in the reduced first user interface region is moved from the reduced first user interface region to a junction between the reduced first user interface region and the second user interface region, content displayed on the display is switched in a shifting manner to completely display the second user interface region.

2. The method according to claim 1, wherein the second user interface region is indicated by displaying a portion of the second user interface region.

3. The method according to claim 2, wherein the portion of the second user interface region is displayed in an unoccupied region of the display when the first user interface region is reduced.

4. The method according to claim 1, wherein a second widget is located in the second user interface region.

5. The method according to claim 4, wherein the first widget being located in the reduced first user interface region is moved from the reduced first user interface region to a junction between the reduced first user interface region and the second user interface region before being placed to the second user interface region.

6. The method according to claim 1, wherein the first user interface region is dynamically reduced in response to the first user operation on the first widget.

7. The method according to claim 1, wherein the first user operation on the first widget triggers a state of the first widget to be a processable mode, so that the first widget is in a waiting-to-be-processed state.

8. A mobile phone, comprising:
a display;
a memory storage having instructions stored therein; and
one or more processors in communication with the display and the memory storage, when the instructions executed by the one or more processors, cause the mobile phone to:
display a first user interface region, wherein one or more widgets is capable of being placed in the first user interface region, a first widget being located in the first user interface region;
detect a first user operation on the first widget in a touching manner;
in response to detecting the first user operation on the first widget,
enable the first widget to be allowed to be moved,
reduce the first user interface region, and
display the reduced first user interface region so that a second user interface region is indicated on the display while the first user interface region is reduced, wherein one or more widgets is capable of being placed in the second user interface region;
detect a dragging operation on the first widget;
in response to detecting the dragging operation on the first widget,
move the first widget being located in the reduced first user interface region from the reduced first user interface region to the second user interface region, and display the second user interface region on the display without displaying the first user interface region, wherein the first widget is displayed on the second user interface region;

wherein after the first widget being located in the reduced first user interface region is moved from the reduced first user interface region to a junction between the reduced first user interface region and the second user interface region, content displayed on the display is switched in a shifting manner to completely display the second user interface region.

9. The mobile phone according to claim 7, wherein the second user interface region is indicated by displaying a portion of the second user interface region.

10. The mobile phone according to claim 9, wherein the portion of the second user interface region is displayed in an unoccupied region of the display when the first user interface region is reduced.

11. The mobile phone according to claim 7, wherein a second widget is located in the second user interface region.

12. The mobile phone according to claim 11, wherein the first widget being located in the reduced first user interface region is moved from the reduced first user interface region to a junction between the reduced first user interface region and the second user interface region before being placed to the second user interface region.

13. The mobile phone according to claim 8, wherein the first user interface region is dynamically reduced in response to the first user operation on the first widget.

14. The mobile phone according to claim 8, wherein the entire second user interface region is displayed on the display.

15. A non-transitory computer-readable storage medium storing one or more programs, the one or more programs including instructions, which, when executed by a mobile phone with a display, and one or more processors, cause the mobile phone to:

display a first user interface region, wherein one or more widgets is capable of being placed in the first user interface region, a first widget being located in the first user interface region;

detect a first user operation on the first widget in a touching manner;

in response to detecting the first user operation on the first widget,
  enable the first widget to be allowed to be moved,
  reduce the first user interface region, and
  display the reduced first user interface region so that a second user interface region is indicated on the display while the first user interface region is reduced, wherein one or more widgets is capable of being placed in the second user interface region;

detect a dragging operation on the first widget;

in response to detecting the dragging operation on the first widget,
  move the first widget being located in the reduced first user interface region from the reduced first user interface region to the second user interface region;
  and display the second user interface region on the display without displaying the first user interface region, wherein the first widget is displayed on the second user interface region;

wherein after the first widget being located in the reduced first user interface region is moved from the reduced first user interface region to a junction between the reduced first user interface region and the second user interface region, content displayed on the display is switched in a shifting manner to completely display the second user interface region.

16. The non-transitory computer-readable storage medium according to claim 15, wherein the second user interface region is indicated by displaying a portion of the second user interface region.

17. The non-transitory computer-readable storage medium according to claim 16, wherein the portion of the second user interface region is displayed in an unoccupied region of the display when the first user interface region is reduced.

18. The non-transitory computer-readable storage medium according to claim 15, wherein a second widget is located in the second user interface region.

\* \* \* \* \*

UNITED STATES PATENT AND TRADEMARK OFFICE
CERTIFICATE OF CORRECTION

PATENT NO. : 10,698,563 B2
APPLICATION NO. : 15/007495
DATED : June 30, 2020
INVENTOR(S) : Peng It is certified that error appears in the above-identified patent and that said Letters Patent is hereby corrected as shown below:

On the Title Page

On Page 2, item (56) under "OTHER PUBLICATIONS", Column 2, Line 5, delete "hunan-computer" and insert -- human-computer --, therefor.

In the Specification

In Column 1, Line 58, delete "According the" and insert -- According to the --, therefor.

In Column 9, Line 27, delete "while other" and insert -- while the other --, therefor.

In Column 9, Line 36, delete "display on" and insert -- displayed on --, therefor.

In Column 11, Line 52, delete "display on" and insert -- displayed on --, therefor.

In the Claims

In Column 17, Line 12, Claim 9, delete "7" and insert -- 8 --, therefor.

In Column 17, Line 19, Claim 11, delete "7" and insert -- 8 --, therefor.

Signed and Sealed this
Sixth Day of September, 2022

Katherine Kelly Vidal
*Director of the United States Patent and Trademark Office*